T. GLOVER.
CAPACITY TESTING APPARATUS FOR GAS METERS.
APPLICATION FILED MAR. 19, 1910.
1,002,672.
Patented Sept. 5, 1911.
2 SHEETS—SHEET 1.
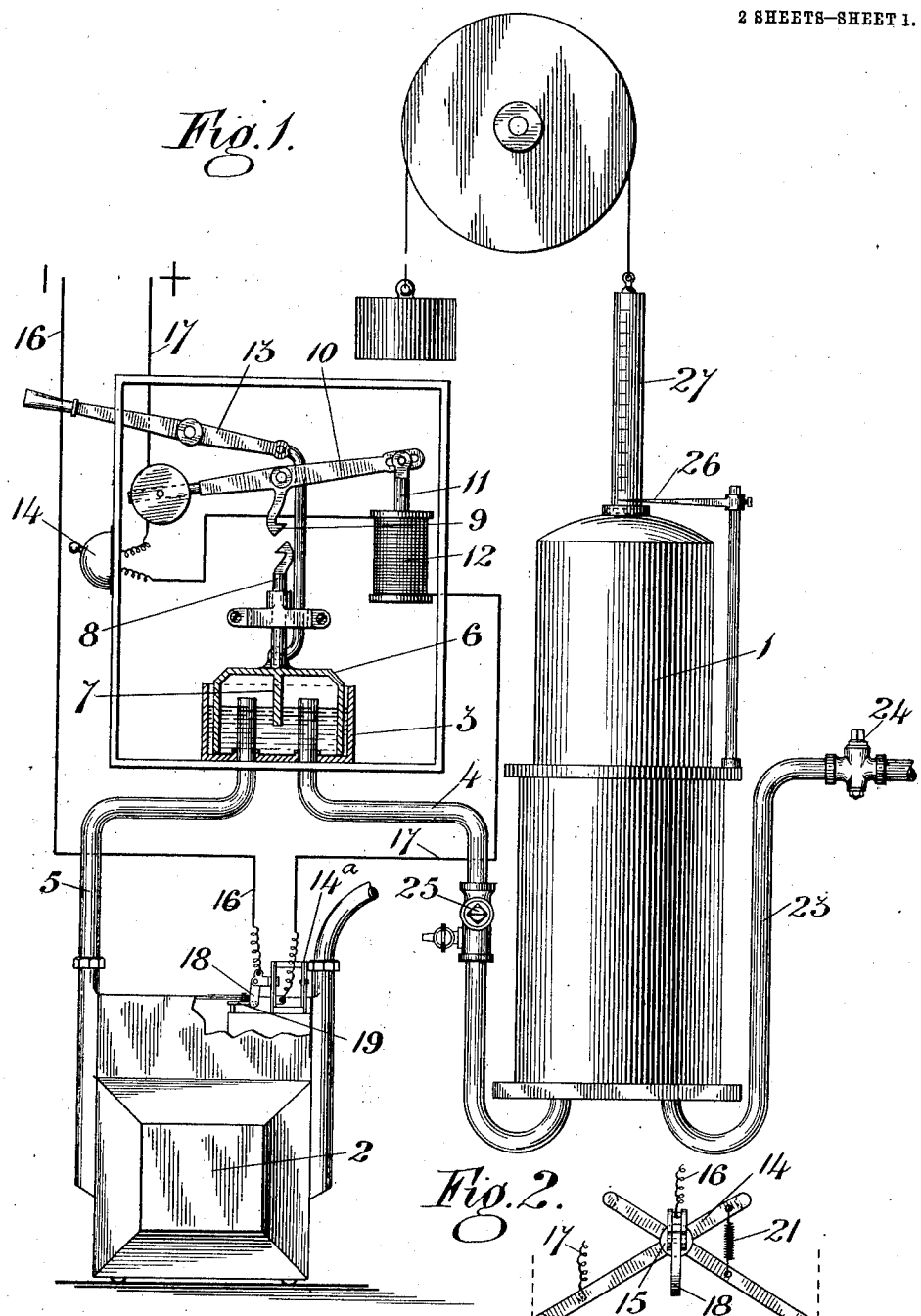

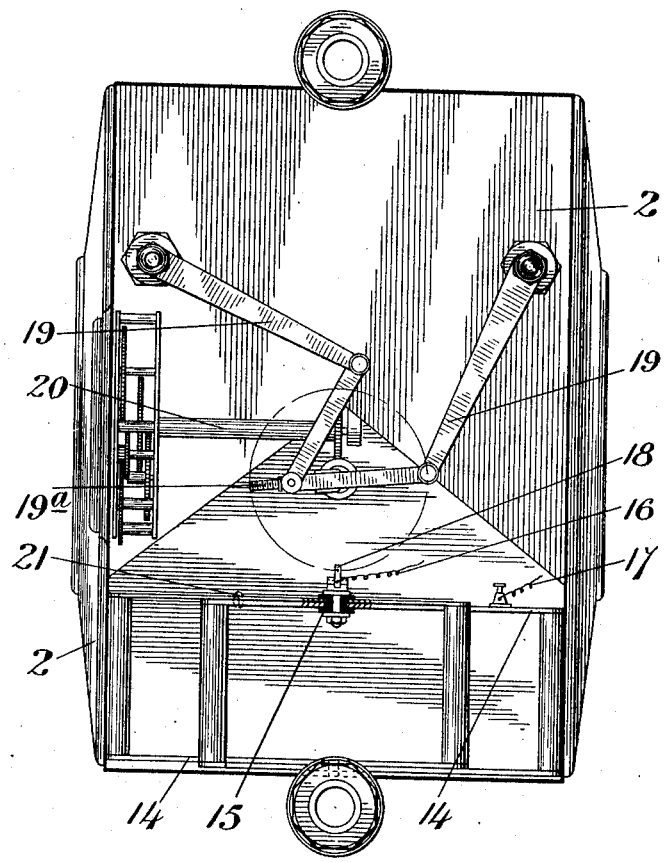

UNITED STATES PATENT OFFICE.

THOMAS GLOVER, OF LONDON, ENGLAND.

CAPACITY-TESTING APPARATUS FOR GAS-METERS.

1,002,672.  Specification of Letters Patent.  Patented Sept. 5, 1911.

Application filed March 19, 1910. Serial No. 550,504.

*To all whom it may concern:*

Be it known that I, THOMAS GLOVER, a subject of the King of Great Britain, residing at London, England, have invented certain new and useful Improvements in Capacity-Testing Apparatus for Gas-Meters, of which the following is a specification.

The object of this invention is improvements in or relating to apparatus for testing the capacity of the diaphragms, bellows, or like measuring appliances of a gas meter by causing either of the actuating arms or the tangent, or a stop or pin on the index spindle to establish an electric circuit on each revolution or complete movement to immediately shut off the supply of gas to the meter.

My invention will be clearly understood from the following description aided by the accompanying drawings in which:—

Figure 1 is a part sectional elevation of an apparatus forming a complete installation. Fig. 2 is a side elevation of a frame for connection to or with the meter being tested. Fig. 3 is a plan of a dry gas meter with the top removed and showing the frame in position.

For the purpose of my invention I position between the ordinary gas bell 1 employed for testing purposes and the meter 2 a mercury cup 3 into which is led the gas pipe 4 from the bell 1, and from which is led the pipe 5 to the meter 2. In this mercury cup 3, I position a sealing bell 6 having a division plate 7 which is situate to act between the two gas pipes 4 and 5, and on the sealing bell 6, I position a hook or hooked rod 8 which engages with a hook 9 on a rocking beam 10, one end of which is connected to the core 11 of a solenoid 12. I also position a lever 13 engaging with the hooked rod 8 on the sealing bell 6 for lifting it out of the mercury cup.

I prefer to employ a switch 14 in connection with the apparatus. I also employ a spring controlled folding frame 14 preferably of X shape, and I insulate the pivot pin 15 from the frame 14 and connect it with one of the lead wires 16, the other lead wire 17 being connected with the frame 14. The pin 15 is provided with a depending pivot piece 18 against which either of the actuating arms 19 or the tangent 19$^a$ or a stop or pin on the index spindle 20 makes contact. In the drawings the tangent 19$^a$ makes contact. This frame 14 is positioned preferably within the top or the meter, as at Fig. 3, and by its construction may fit many sized meters.

21 is the spring connecting the members of the frame 14 so as to insure a grip on the meter casing.

Now supposing it is wished to test a meter to find out the capacity of the bellows, the meter 2 is connected up with the gas pipe 5, the gas testing holder 1 is filled from the pipe 23 and the supply cut off at the tap 24, the frame 14 is placed in position in, on, or adjacent to, the meter with the depending pivot piece of the axle in the path of the actuating arm, tangent, or stop on index spindle. The actuating arm, tangent, or stop on index spindle is set, the bell 6 is lifted in the mercury cup to free the gas pipes, the tap 25 in the pipe 4 is turned on and the gas passes from the gas testing bell, commences to fill the bellows in the meter, the switch 14$^a$ is put on and as soon as the actuating arm, tangent, or stop on index spindle makes the electric contact with the depending pivot piece 18, the electric circuit from the battery through the wire 16, pivot piece 18, meter 2, frame 14, wire 17, is completed and the core 11 of the solenoid is operated to release the sealing bell 6 which immediately drops and shuts off the gas, the meter mechanism being stopped and the switch 14$^a$ turned off. The testing holder 26 is then set for the commencement of a reading, the depending pivot piece 18 is lifted from the path of the actuating arm 19, tangent 19$^a$, or stop on index spindle and the sealing bell 6 is lifted by means of the lever 13 referred to, gas passing through the meter. As soon as the actuating arm 19, tangent 19$^a$, or stop on index spindle is moved away from its original position, the depending pivot piece 18 is dropped into the path of the actuating arm 19, tangent 19$^a$, or stop on index spindle and the current switched on. When the revolution is complete the actuating arm 19, tangent 19$^a$, or stop comes against the depending pivot piece 18, and electrical contact is established and the sealing bell shuts off the gas as before stopping the meter, and the reading is taken by which the correctness or otherwise of the meter can be read on a scale 27 which is divided into parts corresponding with the amount of gas passed through the meter during one revolution or complete movement of the actuating arm, tangent, or stop on index spindle referred to, and which is preferably attached to the top of the holder. These divisions are subdivided into one hundred to give a percentage reading.

What I do claim as my invention and desire to secure by Letters Patent is:—

1. In an apparatus for testing the capacity of diaphragms, bellows or like measuring appliances of a gas meter, the combination with a meter having means to shut off the supply of gas therefrom and also provided with a movable element forming a part of the meter organization, of an electrical circuit having electrically controlled mechanism therein including a frame with a projecting pivot, the pivot being insulated from the frame and the latter so constructed as to fit any size meter, the said movable element of the meter organization operating on each revolution or complete movement thereof to engage the said pivot and establish the circuit to operate the shut-off means and stop the supply of gas to the meter.

2. In apparatus for testing the capacity of diaphragms, bellows, or like measuring appliances of a gas meter, means positionable between the ordinary gas bell and the meter consisting of a mercury cup having the ends of the pipes leading from the gas bell and to the meter, a sealing bell in the cup and having a division plate dividing the ends of the gas pipes, a hook and a lever attached to the sealing bell, a solenoid, a rocking beam carrying a hook and connected to the core of the solenoid, a frame affixable to the meter, a pivot pin on the frame and insulated therefrom, a depending piece attached to the pivot pin and placed in the travel of one of the actuating arms, the tangent or a stop or pin on the index spindle, a battery and electrical wires leading from a battery to the pivot pin of the frame, from the frame to the solenoid thence to the battery.

In testimony whereof I have hereunto set my hand in presence of two subscribing witnesses.

THOMAS GLOVER.

Witnesses:
PERCY E. MATTOCKS,
HUGH HUGHES.

---

Copies of this patent may be obtained for five cents each, by addressing the "Commissioner of Patents, Washington, D. C."